(12) United States Patent  
Nagatani (10) Patent No.: US 6,672,733 B2  
(45) Date of Patent: Jan. 6, 2004

(54) BACKLIGHT UNIT AND LIQUID CRYSTAL DEVICE USING BACKLIGHT UNITS

(75) Inventor: Shinpei Nagatani, Kawasaki (JP)

(73) Assignee: Fujitsu Display Technologies Corporation, Kawasaki (JP)

( * ) Notice: Subject to any disclaimer, the term of this patent is extended or adjusted under 35 U.S.C. 154(b) by 177 days.

(21) Appl. No.: 09/867,821

(22) Filed: May 30, 2001

(65) Prior Publication Data

US 2001/0052955 A1 Dec. 20, 2001

(30) Foreign Application Priority Data

Jun. 8, 2000 (JP) .................................... 2000-171776

(51) Int. Cl.[7] ................................................. F21V 7/04
(52) U.S. Cl. ........................................................ 362/31
(58) Field of Search ............................. 438/14; 349/61; 428/317.9; 362/31

(56) References Cited

U.S. PATENT DOCUMENTS 5,976,686 A * 11/1999 Kaytor .................... 428/317.9

6,196,691 B1 * 3/2001 Ochiai ........................ 362/31

FOREIGN PATENT DOCUMENTS

JP 7-301797 11/1995

* cited by examiner

Primary Examiner—Nathan J. Flynn  
Assistant Examiner—Andre C. Stevenson  
(74) Attorney, Agent, or Firm—Greer, Burns & Crain, Ltd.

(57) ABSTRACT

In a backlight unit, a plurality of light sources whose luminescent chromaticities are different mutually, i.e., a white color fluorescent tube W, a red color fluorescent tube R, a green color fluorescent tube G, and a blue color fluorescent tube B, are arranged on both end in a longitudinal direction of a light guide plate respectively. The white color fluorescent tube W is arranged at a position closest to the end surface in a longitudinal direction of the light guide plate. Luminances of these fluorescent tubes W, R, G, B can be adjusted independently by control voltages supplied from external devices. Lights emitted from a plurality of light sources enter into the light guide plate, and then the lights are emitted from the light guide plate in a predetermined direction. Since the backlight unit itself has a color adjusting function, the reduction of the luminance and the change of the color balance due to degradation of the fluorescent tubes can be corrected.

12 Claims, 10 Drawing Sheets

① LUMINOUS INTENSITY ADJUSTING CIRCUIT
② TRANSFORMER

FIG. 4

① LUMINOUS INTENSITY ADJUSTING CIRCUIT
② TRANSFORMER

BACKLIGHT UNIT AND LIQUID CRYSTAL DEVICE USING BACKLIGHT UNITS

BACKGROUND OF THE INVENTION

1. Field of the Invention

The present invention relates to a backlight unit having a color adjusting function and a liquid crystal display device having backlight units.

2. Description of the Prior Art

The liquid crystal display device has such a merit that the device is thin in thickness, is light in weight, is driven by a low voltage, and needs small power consumption. Thus, the liquid crystal display device is extensively employed in various electronic devices.

In particular, the active-matrix type liquid crystal display device in which active elements such as TFTs (Thin Film Transistors) are provided every pixel is excellent such that the device is equivalent to the CRT (Cathode-Ray Tube) in the respects such as the luminance, the viewing angle characteristic, etc. Therefore, recently the liquid crystal display device of this type is also employed as the display device for the mobile television, the personal computer, etc.

Normally the backlight units are incorporated into the liquid crystal display device on the back surface side of the liquid crystal display panel. The transmittance of lights that are emitted from the backlight units is controlled every pixel constituting the liquid crystal display panel to display the image.

Figure 1:
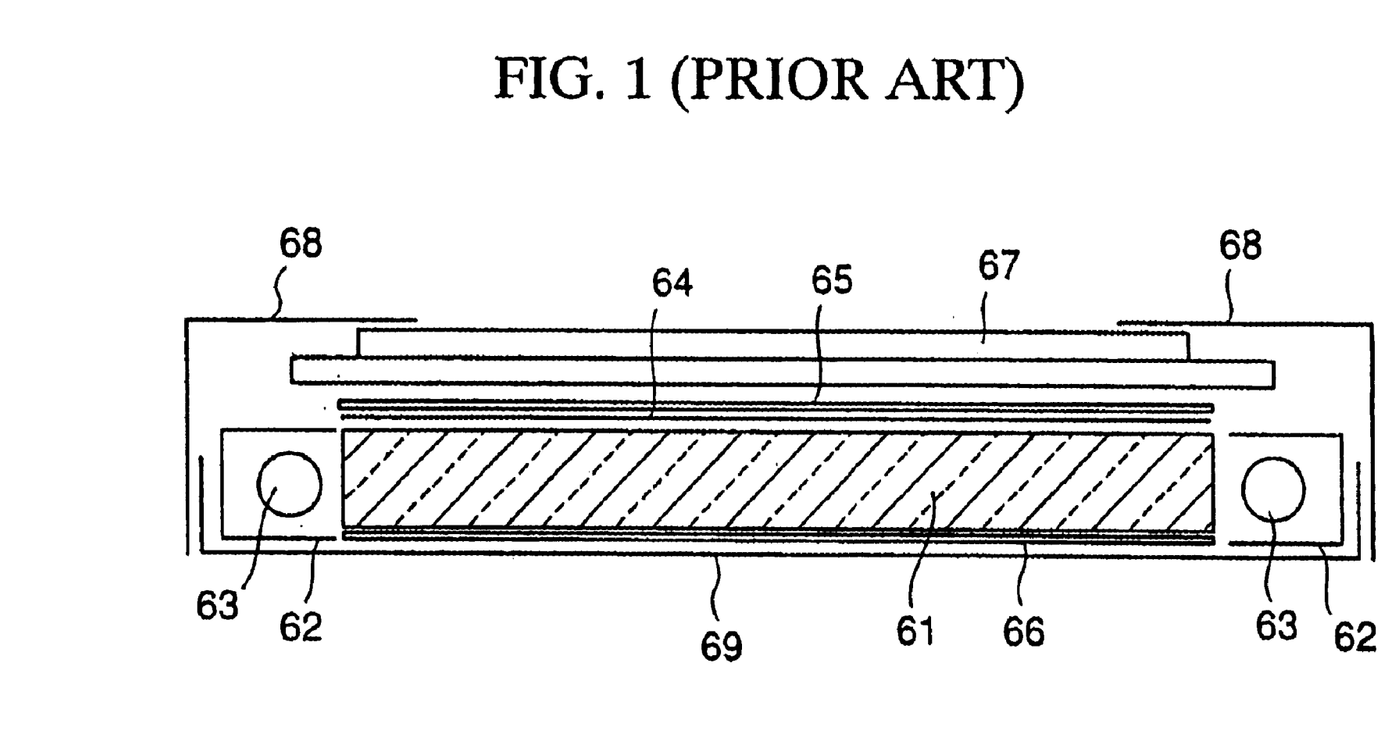
FIG. 1 is a sectional view showing a configuration of a liquid crystal display device including a backlight unit in the prior art.

FIG. 1 is a sectional view showing a configuration of the liquid crystal display device including the backlight unit in the prior art.

The backlight unit has a light guide plate 61, white color fluorescent tubes 63 arranged on both longitudinal sides of the light guide plate 61 respectively, and reflectors 62 for reflecting the lights that are emitted from these fluorescent tubes 63 toward the light guide plate 61 respectively. The backlight unit is installed in a casing 69. A reflection sheet 66 is arranged on the back surface side of the light guide plate 61, and a diffusion sheet 64 and a prism sheet 65 are laminated to be arranged on the front surface side.

A liquid crystal panel 67 is placed over the prism sheet 65, and is fitted to the casing 69 by using a metal bezel 68.

In the liquid crystal display device constructed in this manner, the lights emitted from the fluorescent tubes 63 enter into the light guide plate 61 directly or after they are reflected by the reflectors 62. The incident lights into the light guide plate 61 can propagate through the light guide plate 61 while reflecting repeatedly between an upper surface and a lower surface of the light guide plate 61. The lights that exceed a critical angle are emitted from the light guide plate 61 to the liquid crystal panel 67. The lights that are emitted from the light guide plate 61 are diffused by the diffusion sheet 64 and the prism sheet 65 such that the direction of the light is regulated, and then reach the liquid crystal panel 67.

SUMMARY OF THE INVENTION

It is an object of the present invention to provide a backlight unit having a color adjusting function to itself and a liquid crystal display device having backlight units.

In order to achieve the above object, there is provided a backlight unit of the present invention comprising a plurality of light sources whose luminescent chromaticities are different mutually, said plurality of light sources including at least one white color light source; and a light guide plate for receiving lights emitted from said plurality of light sources and emitting the lights to a predetermined direction.

According to the above configuration, in the backlight unit of the present invention, a plurality of light sources whose luminescent chromaticities are different mutually are provided to give a color adjusting function to the unit itself, and the luminances of respective light sources are controlled independently by the control voltages supplied from external devices. For example, since the white color fluorescent tube, the red color fluorescent tube, the green color fluorescent tube, and the blue color fluorescent tube are provided as the light sources, the lights emitted from the light guide plate can be controlled into the desired color.

In this case, since the white color fluorescent tube is provided, the magnitude of the influence upon the luminance change and the color change caused when a quantity of the lights emitted from the red color fluorescent tube, the green color fluorescent tube, and the blue color fluorescent tube are changed independently can be relaxed and adjusted by the luminance level of the white color fluorescent tube.

Such backlight unit is arranged on the back surface side of the liquid crystal panel, and the liquid crystal display device that is able to display the image having the excellent color reproducibility can be obtained.

DESCRIPTION OF THE PREFERRED EMBODIMENTS

In the above liquid crystal display device in the prior art, when the fluorescent tubes in the backlight unit are degraded with the lapse of time, a quantity of light is reduced and the color balance is disturbed. In such case, such color unbalance can be treated to some extent by controlling the R, G, B display tones of the liquid crystal panel. However, problems exist such that, if the luminance of the screen is increased, color adjustment of the liquid crystal panel becomes impossible, and if the color adjustment is forcedly carried out, the number of available tones is limited.

In the backlight unit in the prior art, normally the white color fluorescent tubes are employed. Thus, the luminance can be adjusted but the backlight unit itself does not have a color adjusting function.

This application can overcome the above problems by providing the color adjusting function to the backlight unit.

Also, if the backlight unit itself is able to perform the color adjustment, the characteristic of the liquid crystal display device can be uniformized even in the situation that the characteristic of the liquid crystal panel is varied product by product. In addition, the light emitted from the backlight unit can be adjusted to any color based on the user's taste.

Further, in the backlight unit in the prior art, the color reproduction range is limited by the luminescent wavelength of the fluorescent tube used as the light source and the transmitting characteristic of the color filter in the liquid crystal panel. Therefore, in the liquid crystal display device in the prior art, it is impossible to achieve the luminescent chromaticity range of the CRT, i.e., the luminescent chromaticity range that is equal to or more than the luminescent chromaticity range of the fluorescent substance defined by EBU (European Broadcasting Union). The color reproducibility can be improved by the methods such as the method of increasing the thickness of the color filter in the liquid crystal panel, etc. However, in such case, the problem occurs that, since the transmittance of light is lowered, the screen is darkened.

Then, in Patent Application Publication (KOKAI) Hei 7-301797, the liquid crystal display device is set forth wherein two fluorescent tubes are arranged in parallel on both longitudinal sides of the light guide plate respectively and also ends, that are connected to the power supply, of the fluorescent tubes are positioned on both sides of the light guide plate to direct in different directions. However, in this liquid crystal display device, since two of the same fluorescent tubes are employed respectively and the fluorescent tubes that have the different luminescent chromaticity respectively are not employed, the backlight unit does not have a color adjusting function.

Embodiments of the present invention will be explained with reference to the accompanying drawings hereinafter.

First Embodiment

Figure 2:
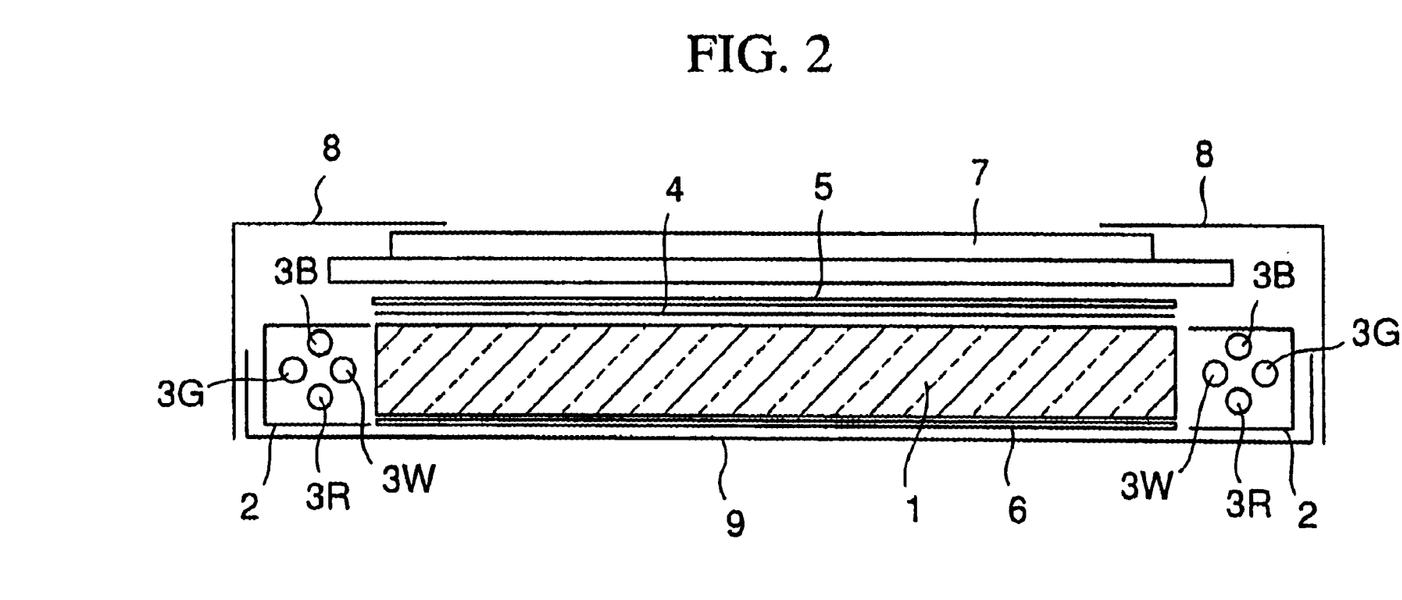
FIG. 2 is a sectional view showing a configuration of a liquid crystal display device including a backlight unit according to a first embodiment of the present invention.

FIG. 2 is a sectional view showing a configuration of a liquid crystal display device including a backlight unit according to a first embodiment of the present invention.

The backlight unit includes a light guide plate 1, white color fluorescent tubes 3W, red color fluorescent tubes 3R, green color fluorescent tubes 3G, and blue color fluorescent tubes 3B arranged on both ends in a longitudinal direction of the light guide plate 1 respectively, and reflectors 2 for reflecting the lights that are emitted from these fluorescent tubes 3W, 3R, 3G, 3B toward the light guide plate 1 respectively. The backlight unit is installed in a casing 9.

In this example, the white color fluorescent tubes 3W are arranged at the position closest to both end surfaces in a longitudinal direction of the light guide plate 1, the red color fluorescent tubes 3R and the blue color fluorescent tubes 3B are arranged at a position more remote than the white color fluorescent tubes 3W from both end surfaces in a longitudinal direction of the light guide plate 1, and the green color fluorescent tubes 3G are arranged at a position remotest from both end surfaces in a longitudinal direction of the light guide plate 1.

A reflection sheet 6 is arranged on the back surface side (the lower side in FIG. 2: referred to as a "lower surface" hereinafter) of the light guide plate 1, and a diffusion sheet 4 and a prism sheet 5 are arranged on the front surface side (the upper side in FIG. 2: referred to as a "upper surface" hereinafter). A liquid crystal panel 7 is placed over the prism sheet 5, and is fitted to the casing 9 by using a metal bezel 8.

The light guide plate 1 is formed of a transparent plate such as acryl, etc., for example. The lights emitted from the fluorescent tubes 3W, 3R, 3G, 3B enter into the light guide plate 1 directly or after they are reflected by the reflectors 2. The incident lights into the light guide plate 1 can propagate through the light guide plate 1 while reflecting repeatedly between the upper surface and the lower surface of the light guide plate 1. The lights that exceed the critical angle are emitted from the light guide plate 1 to the liquid crystal panel 7.

A large number of minute irregularities, for example, are provided on the diffusion sheet 4. The lights emitted from the light guide plate 1 are diffused by the diffusion sheet 4, and thus the uniformity of the diffusion of the light from the emitting surface can be enhanced. A large number of grooves that have an isosceles triangle sectional shape respectively, for example, are provided in parallel with each other to the prism sheet 5. The lights that are diffused by the diffusion sheet 4 are collimated to enter substantially perpendicularly into the liquid crystal panel 7.

The liquid crystal panel 7 is the TN (Twisted Nematic) liquid crystal panel that is normally known, and has a configuration in which the liquid crystal is sealed between two sheets of transparent substrates. A pixel electrode is provided to one side of the transparent substrates every pixel, and a common electrode and a color filter are provided to the other side of the transparent substrates. The image is displayed by controlling the transmittance of light pixel by pixel.

However, in the present invention, the configuration of the liquid crystal panel 7 is not limited to the above. For example, the present invention may be applied to the VA (Vertically Aligned) liquid crystal panel.

Figure 3:
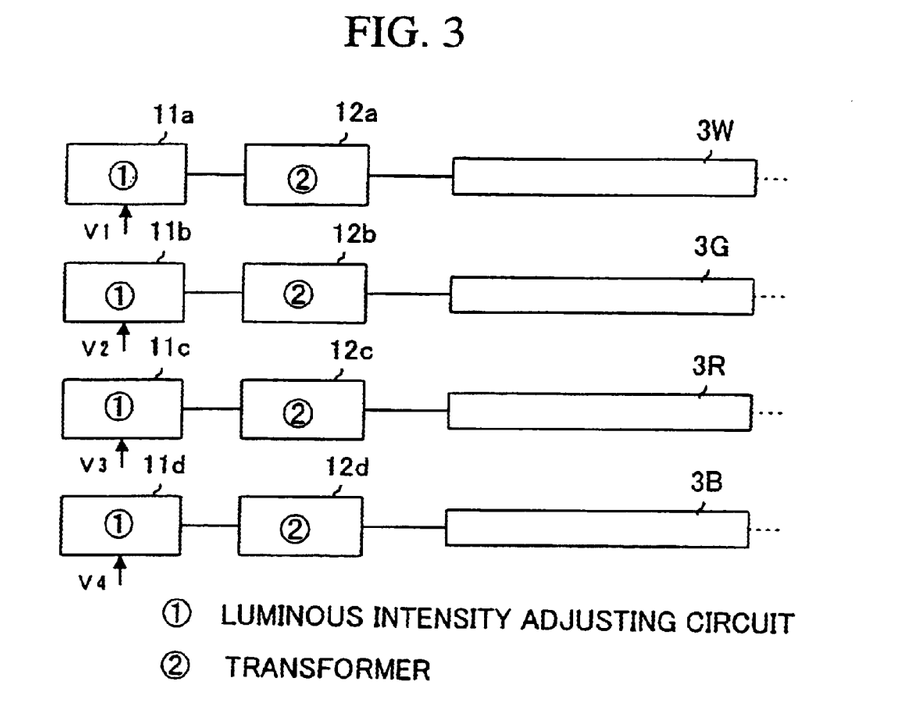
FIG. 3 is a block diagram showing an example of the lighting circuit for lighting a plurality of fluorescent tubes as light sources of the present invention.

FIG. 3 is a block diagram showing an example of the lighting circuit for lighting a plurality of fluorescent tubes as light sources of the backlight unit of the present invention.

This lighting circuit consists of four luminous intensity adjusting circuits 11a to 11d and four transformers 12a to 12d. These luminous intensity adjusting circuits 11a to 11d output AC pulse voltages whose effective powers are changed in response to control voltages V1 to V4 supplied from external circuits respectively.

The AC pulse voltages being output from the luminous intensity adjusting circuits 11a to 11d are increased by the transformers 12a to 12d respectively and then supplied independently to the fluorescent tubes 3W, 3R, 3G, 3B. That is, respective fluorescent tubes 3W, 3R, 3G, 3B emit the light with the luminance that responds to the control voltages V1 to V4 supplied from the external circuits respectively.

In this case, the luminous intensity adjusting circuits 11a to 11d and the transformers 12a to 12d constituting the lighting circuit may be provided in the casing 9 or may be provided on the outside of the casing 9.

In the present embodiment, the white color fluorescent tubes 3W, the red color fluorescent tubes 3R, the green color fluorescent tubes 3G, and the blue color fluorescent tubes 3B are provided, and then a quantity of light that are emitted from these fluorescent tubes 3W, 3R, 3G, 3B can be controlled independently in response to the control voltages V1 to V4. Therefore, any luminance can be selected, and the color of the light emitted from the light guide plate 1 to the liquid crystal panel 7 can be set arbitrarily. Thus, reduction in the luminance and change in the color balance due to the time dependent degradation of the fluorescent tubes, for example, can be corrected.

Also, in the present embodiment, the magnitude of the influence upon the luminance change and the color change caused when a quantity of the light emitted from the red color fluorescent tubes 3R, the green color fluorescent tubes 3G, and the blue color fluorescent tubes 3B are changed independently can be relaxed and adjusted by the luminance level of the white color fluorescent tubes 3W.

In addition, in the present embodiment, the white color fluorescent tubes 3W are arranged at the position closest to the both end surfaces in a longitudinal direction of the light guide plate 1, the green color fluorescent tubes 3G are arranged at the position remotest from the both end surfaces in a longitudinal direction of the light guide plate 1, and the red color fluorescent tubes 3R and the blue color fluorescent tubes 3B are arranged between them.

If the red color fluorescent tubes 3R and the blue color fluorescent tubes 3B are arranged at the position closest to both end surfaces in a longitudinal direction of the light guide plate 1, in some cases either the striped pattern of the red color and the blue color occurs or the color unevenness occurs especially in the neighborhood of the side surfaces of the light guide plate 1.

The generation of the striped pattern and the color unevenness can be avoided by arranging the white color fluorescent tubes 3W at the position closest to both end surfaces in a longitudinal direction of the light guide plate 1. In particular, like the present embodiment, the generation of the striped pattern and the color unevenness can be avoided without fail by providing the fluorescent tubes, which generate the red color light and the blue color light that are ready to be conspicuous on the screen, between the white color fluorescent tube 3W and the green color fluorescent tube 3G.

Figure 4:
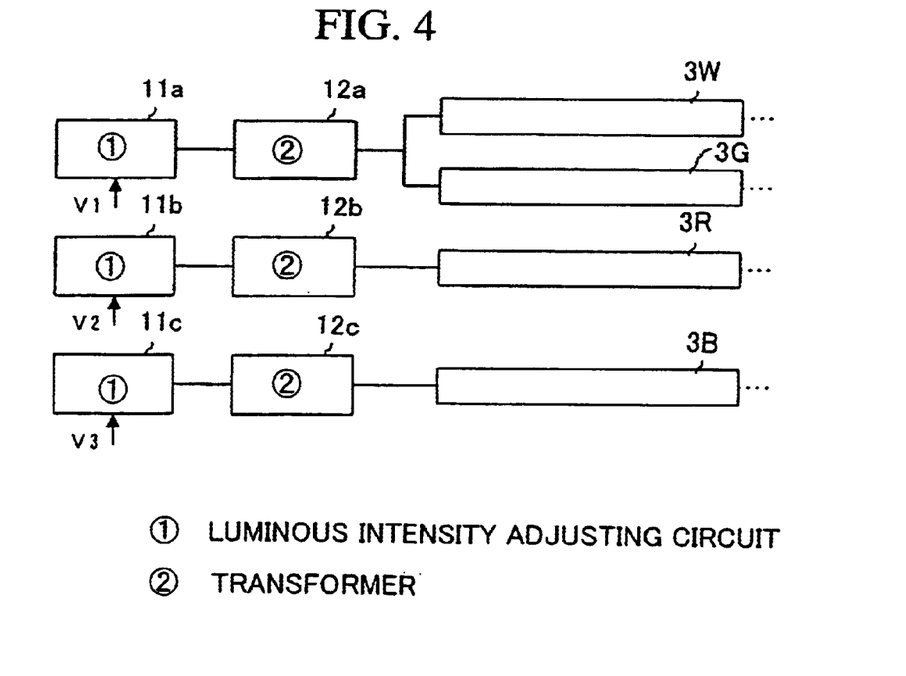
FIG. 4 is a block diagram showing another example of the lighting circuit for lighting a plurality of fluorescent tubes as light sources of the present invention.

FIG. 4 is a block diagram showing another example of the lighting circuit for lighting a plurality of fluorescent tubes as the light sources of the present invention.

In this example, the lighting circuit has three luminous intensity adjusting circuits 11a to 11c and three transformers 12a to 12c. These luminous intensity adjusting circuits 11a to 11c output the AC pulse voltages whose effective powers are changed in response to the control voltages V1 to V3 supplied from external circuits respectively.

The pulse voltages output from the luminous intensity adjusting circuits 11a to 11c are increased by the transformers 12a to 12c respectively and then supplied to the fluorescent tubes 3W, 3R, 3G, 3B. In this example, the white color fluorescent tube 3W and the green color fluorescent tube 3G are connected to the same transformer 12a, the red color fluorescent tubes 3R is connected to the transformer 12b, and the blue color fluorescent tubes 3B is connected to the transformer 12c.

In this lighting circuit, the white color fluorescent tube 3W and the green color fluorescent tube 3G are controlled simultaneously and also the red color fluorescent tubes 3R and the blue color fluorescent tubes 3B are controlled independently respectively. Therefore, there is such a merit that the number of the luminous intensity adjusting circuits and the transformers can be reduced rather than the lighting circuit shown in FIG. 3.

In this case, as shown in FIG. 4, if the white color fluorescent tube 3W and the green color fluorescent tube 3G are controlled together with, it is apprehensive that the luminance is largely changed when the display color is adjusted or the display color is remarkably changed when the luminance is controlled. But there is no problem in practical use. This is because the green color luminescence exerts mostly an influence upon the luminance (the characteristic that can be understood from the spectral luminous efficacy characteristic of the human eye) and the green color itself has the wide area that can be regarded as the color matching on the chromaticity diagram (the green color has the widest area on the XY chromaticity diagram which indicates the color that can be sensed with the human eye), and because, if the luminance adjustment and the green color adjustment are equal, no influence is caused in practical use and, if the green color luminescence is changed, such change seldom appears as the change in the display color.

Second Embodiment

Figure 5:
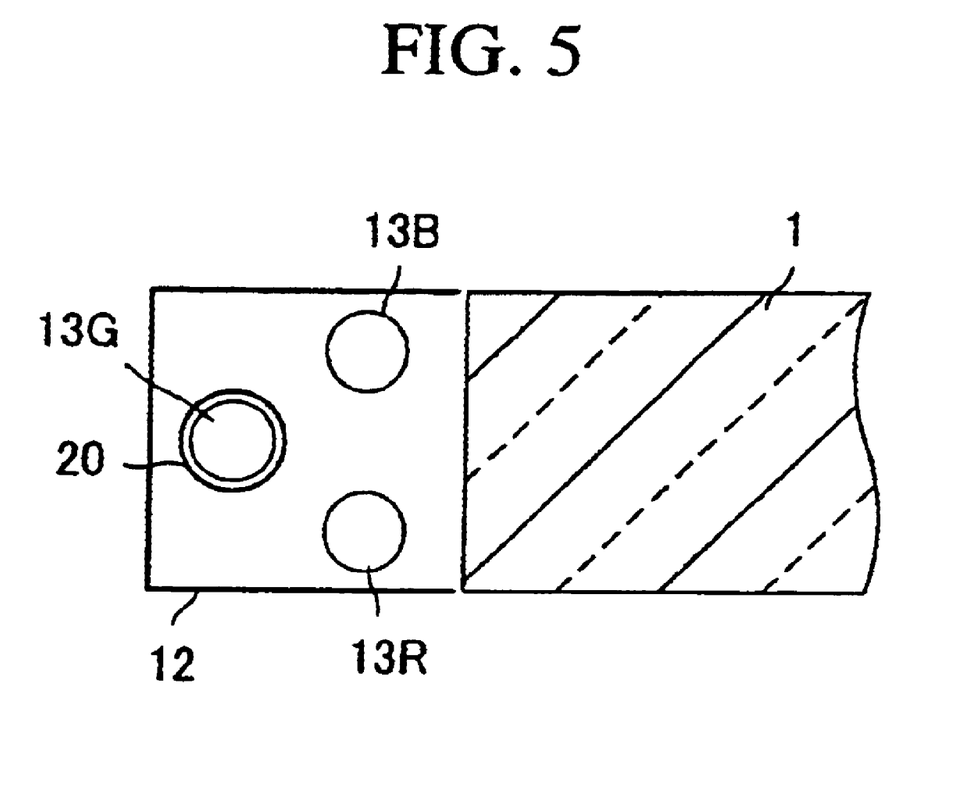
FIG. 5 is a sectional view showing a configuration of a pertinent portion of a backlight unit according to a second embodiment of the present invention.

FIG. 5 is a sectional view showing a configuration of a pertinent portion of a backlight unit according to a second embodiment of the present invention. In this case, a difference of the second embodiment from the first embodiment is that arrangement of a plurality of fluorescent tubes arranged on the inside of a reflector 12 is different. Since other configurations are basically similar to the first embodiment, their illustration and explanation of configurations of the same portions are omitted.

Figure 6:
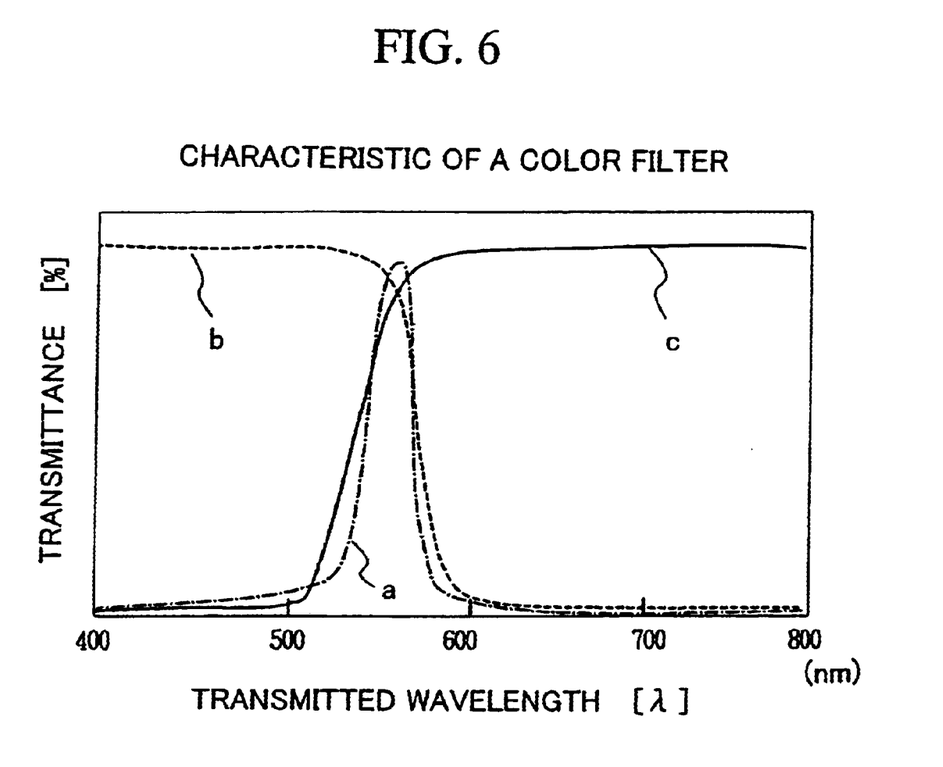
FIG. 6 is a view showing a characteristic of a color filter employed in the backlight unit according to the second embodiment of the present invention.

A red color fluorescent tube 13R, a green color fluorescent tube 13G, and a blue color fluorescent tube 13B are arranged on the inside of the reflector 12. The green color fluorescent tube 13G is covered with a cylindrical green color filter 20. As indicated by a dot-dash line curve a in FIG. 6, this color filter 20 has the characteristic that cuts off the light whose wavelength is less than about 500 nm and the light whose wavelength is more than about 600 nm.

The fluorescent tubes 13R, 13G, 13B are connected to the lighting circuits (where three sets of the luminous intensity adjusting circuits and the transformers are employed respectively) shown in FIG. 3, and a quantity of light from them can be adjusted independently.

Figure 7:
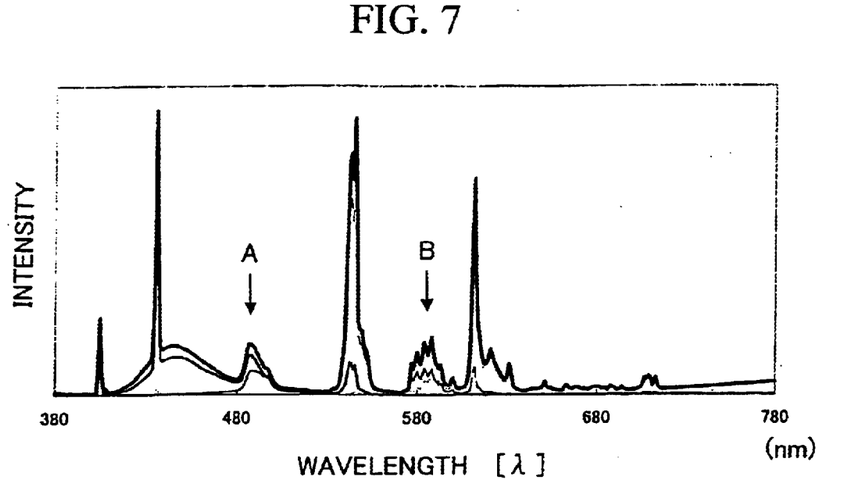
FIG. 7 is a view showing a spectral characteristic of the luminescence from each light source of the backlight unit of the present invention when no filter is provided.
Figure 8:
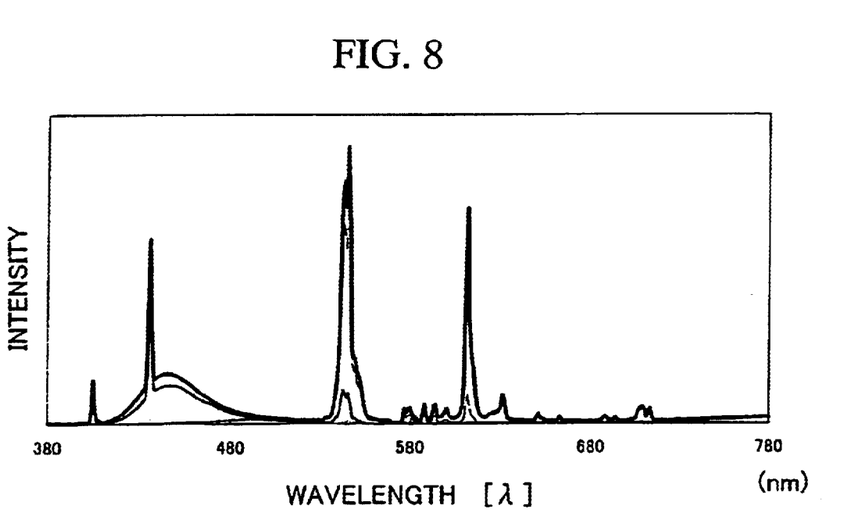
FIG. 8 is a view showing a spectral characteristic of the luminescence from each light source of the backlight unit of the present invention when a filter is provided.

FIG. 7 is a view showing a spectral characteristic of the luminescence from each light source of the backlight unit of the present invention when no filter is provided. FIG. 8 is a view showing a spectral characteristic of the luminescence from each light source of the backlight unit of the present invention when the filter is provided.

It is preferable that, in the backlight unit employed in the liquid crystal display device, the spectral distribution of light should match the transmitting characteristic of the color filter in the liquid crystal panel, peaks of the luminous wavelengths of the red color light, the green color light, and the blue color light should be formed as steep as possible, the red color light should have the peak on the longer wavelength side, and the blue color light should have the peak on the shorter wavelength side.

In the case that the green color filter 20 is not provided to the green color fluorescent tube 13G of the backlight unit shown in FIG. 5, lights (indicated by arrows A, B in FIG. 7) other than main luminescence of the red color, the green color, and the blue color are generated, as shown in FIG. 7. These lights obstruct the expansion of the color reproduction range as the display color.

In contrast, if the green color fluorescent tube 13G is covered with the green color filter 20, the lights having the wavelengths that disturb the expansion of the color reproduction range can be cut off, as shown in FIG. 8. Accordingly, in the second embodiment, in addition to the advantages similar to those in the first embodiment, there can be obtained such an advantage that the compatibility of the expansion of the color reproduction range and the high transmittance can be achieved.

In the above example, the color filter that can transmit selectively only the green color light is employed. The filter that cut off the light having the wavelength shorter than the green color (i.e., the filter that has the characteristic indicated by a solid line curve c in FIG. 6) may be employed. In this case, the luminescence peak indicated by the arrow A in FIG. 7 can be reduced. Similarly, the filter that cut off the light having the wavelength longer than the green color (i.e., the filter that has the characteristic indicated by a dotted line curve b in FIG. 6) may be employed. In this case, the luminescence peak indicated by the arrow B in FIG. 7 can be reduced.

Also, in the above embodiment shown in FIG. 5, the case where the green color fluorescent tube 13G is covered with the green color filter 20 is explained. But the red color fluorescent tube 13R or the blue color fluorescent tube 13B may be covered with the color filter that can limit the wavelength of the transmitted light. That is, if the transmitting characteristic of the light having the wavelength other than those of the main luminescence is controlled by the color filter, the color reproduction range can be expanded and also the quality of the image can be improved.

Figure 9:
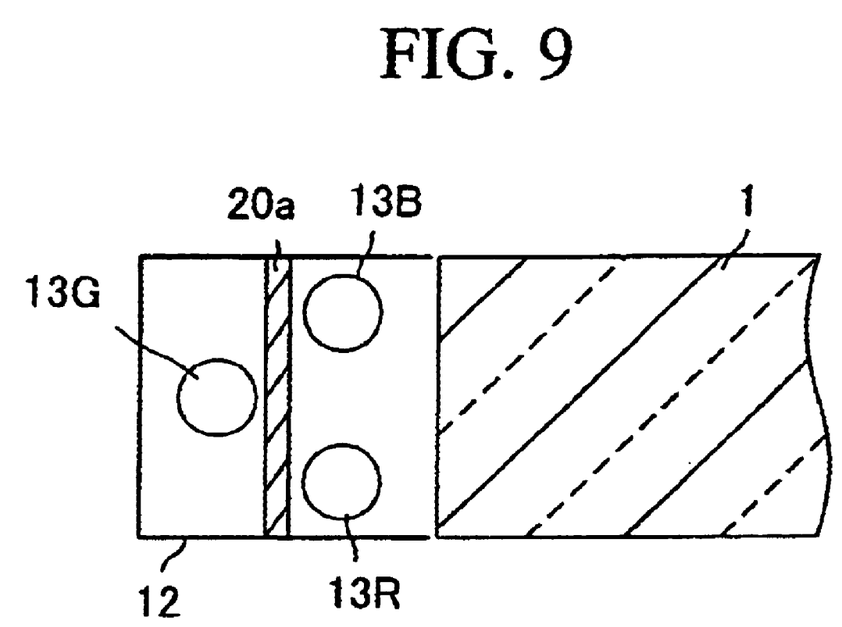
FIG. 9 is a sectional view showing a variation of the configuration of the pertinent portion of the backlight unit according to the second embodiment of the present invention.

FIG. 9 is a view showing a variation of the second embodiment shown in FIG. 5.

The red color fluorescent tube 13R and the blue color fluorescent tube 13B are arranged at the position close to the end surface in a longitudinal direction of the light guide plate 1. The green color fluorescent tube 13G is arranged at the position remoter from the end surfaces in a longitudinal direction of the light guide plate 1.

A plate-like green color filter 20a is arranged between the green color fluorescent tube 13G and the red color fluorescent tube 13R and the blue color fluorescent tube 13B. In this example, there is such an advantage that, since the plate-like green color filter 20a that is prepared separately may be arranged between the fluorescent tube 13G and the fluorescent tubes 13R, 13B, the production of the backlight unit can be easily facilitated in contrast to the backlight unit employing the cylindrical filter.

Third Embodiment

Figure 10:
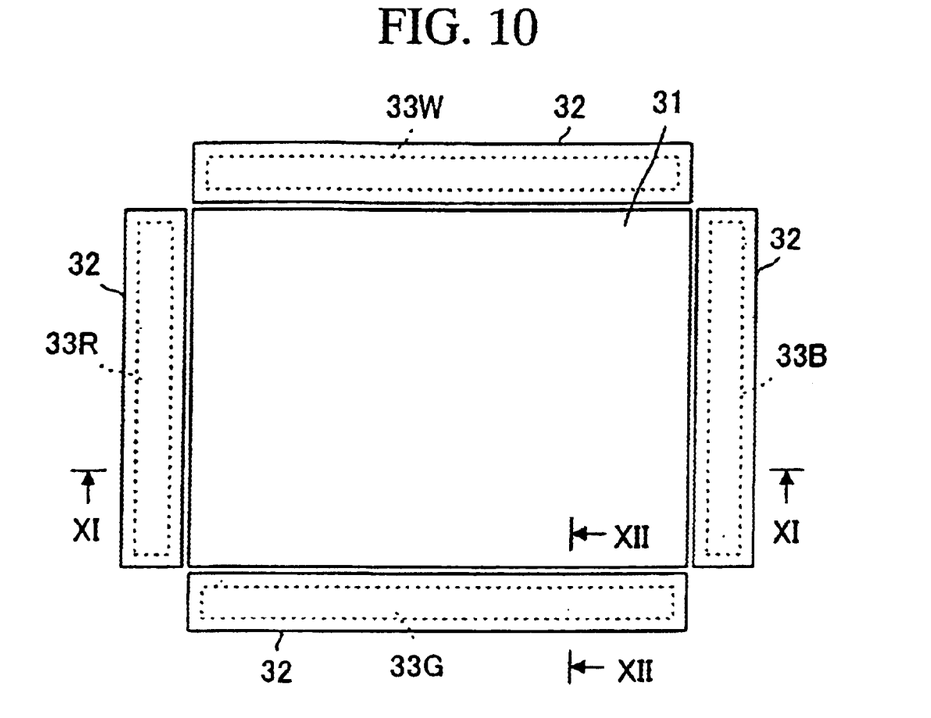
FIG. 10 is a plan view showing a configuration of a backlight unit according to a third embodiment of the present invention.
Figure 11:
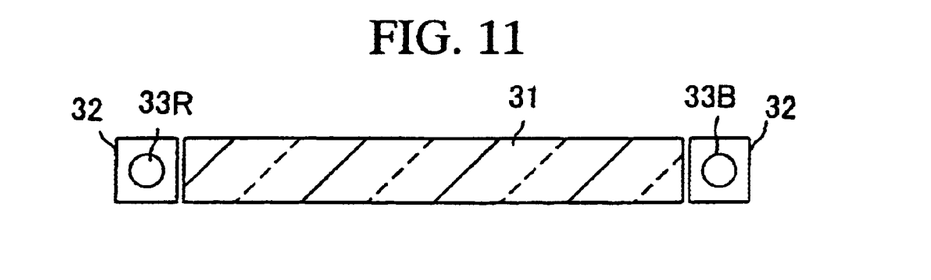
FIG. 11 is a sectional view showing a sectional shape taken a long a XI—XI line in FIG. 10.
Figure 12:
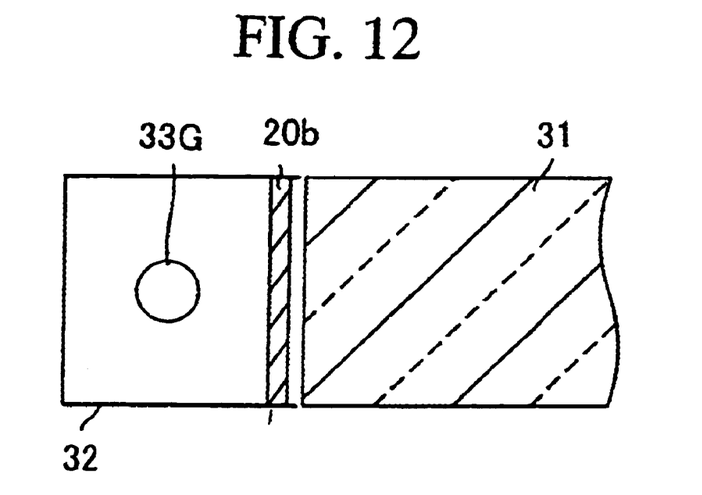
FIG. 12 is a sectional view showing a sectional shape taken a long a XII—XII line in FIG. 10.

FIG. 10 is a plan view showing a configuration of a backlight unit according to a third embodiment of the present invention. FIG. 11 is a sectional view showing a sectional shape taken a long a XI—XI line in FIG. 10. FIG. 12 is a sectional view showing a sectional shape taken a long a XII—XII line in FIG. 10. In this case, illustration of the reflection plate, the diffusion sheet, the prism sheet, etc. is omitted in FIG. 10 and FIG. 11.

In the third embodiment, a white color fluorescent tube 33W, a red color fluorescent tube 33R, a green color fluorescent tube 33G, and a blue color fluorescent tube 33B, that have a different luminescent color respectively, are arranged on four side surfaces of a light guide plate 31. Then, the fluorescent tube 33W, 33R, 33G, 33B are covered with a reflector 32 respectively.

Also, as shown in FIG. 12, a green color color filter 20b is arranged between the green color fluorescent tube 33G and a light guide plate 31. However, such green color filter 20b is not essential in the third embodiment, and may be added appropriately according to the desired characteristic or the configuration of the light source. Also, as the case may be, a filter that can limit the wavelength of the transmitted light between the red color fluorescent tube 33R or the blue color fluorescent tube 33B and the light guide plate 31.

These fluorescent tubes 33W, 33R, 33G, 33B are connected to the lighting circuits shown in FIG. 3, for example, and a quantity of light of them can be adjusted independently respectively. Also, the white color fluorescent tube 33W and the green color fluorescent tube 33G may be controlled together, and the red color fluorescent tube 33R and the blue color fluorescent tube 33B may be controlled independently respectively.

In the third embodiment, the advantage similar to that in the first embodiment can be achieved. Also, according to the third embodiment, since a combination of one fluorescent tube and one reflector is employed as one light source unit, merely the fluorescent tube unit that is deteriorated because of the elapsed time can be exchanged if the color balance is lost due to the time dependent degradation of the fluorescent tube, for example, and thus the exchanging operation for the fluorescent operation becomes easy.

Fourth Embodiment

Figure 13:
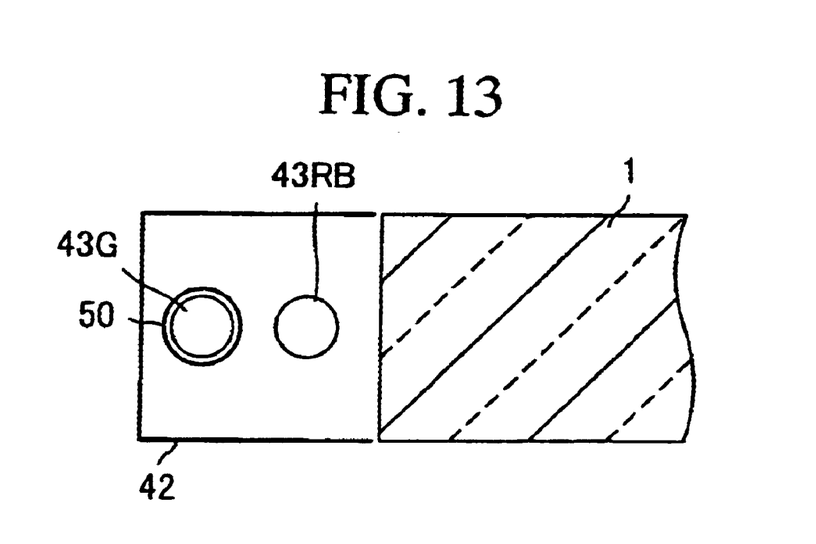
FIG. 13 is a sectional view showing a configuration of a pertinent portion of a backlight unit according to a fourth embodiment of the present invention.

FIG. 13 is a view showing a backlight unit according to a fourth embodiment of the present invention. In this case, a difference of the fourth embodiment from the first embodiment is that types and arrangement of the fluorescent tubes arranged on the inside of the reflector are different. Since other configurations are basically similar to the first embodiment, their illustration and explanation of overlapped portions are omitted.

In the fourth embodiment, a green color fluorescent tube 43G and a purple color fluorescent tube 43RB are arranged on the inside of a reflector 42. A cylindrical green color filter 50 is provided around the green color fluorescent tube 43G.

Also, the fluorescent tube 43RB is such a fluorescent tube that employs mixed fluorescent substance of the fluorescent substance having the blue color as the main wavelength and the fluorescent substance having the red color as the main wavelength. These fluorescent tubes 43G, 43RB are connected to the lighting circuits (where two sets of the luminous intensity adjusting circuits and the transformers are employed respectively) shown in FIG. 3, and a quantity of light of them can be adjusted independently.

In the fourth embodiment, a quantity of light of the green color fluorescent tube 43G and the purple color fluorescent tube 43RB can be adjusted independently by controlling independently the AC pulse voltages that are supplied to the green color fluorescent tube 43G and the purple color fluorescent tube 43RB. Also, the color of the light emitted from the light guide plate 1 to the liquid crystal panel side can be arbitrarily set.

As a result, it is possible to correct the reduction of the luminance and the change of the color balance due to the time dependent degradation of the fluorescent tube, for example. Also, since the light having the unnecessary wavelength can be cut off by the color filter 50, the color reproduction range of the display color can be expanded. In this case, in the fourth embodiment, the color filter 50 is not essential, and may be added appropriately according to the desired characteristic or the configuration of the light source.

Fifth Embodiment

Figure 14:
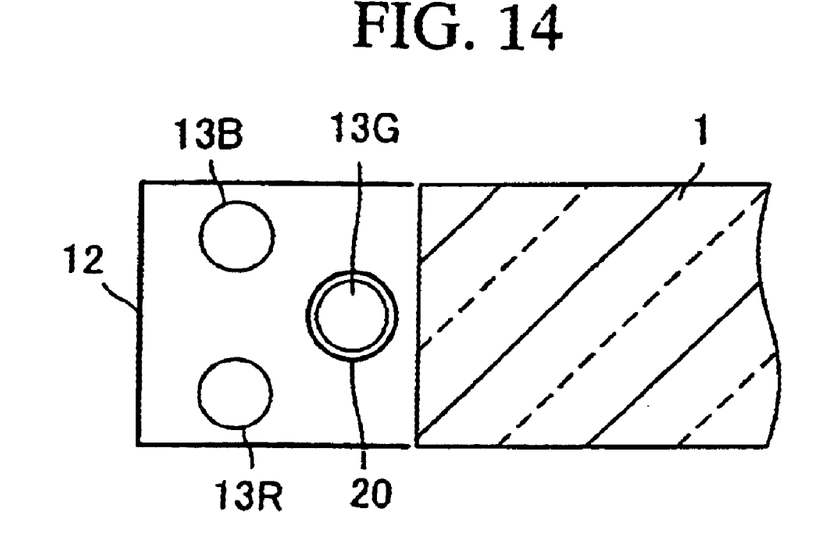
FIG. 14 is a sectional view showing a configuration of a pertinent portion of a backlight unit according to a fifth embodiment of the present invention.

FIG. 14 is a view showing a backlight unit according to a fifth embodiment of the present invention. In this case, a difference of the fifth embodiment from the first embodiment is that arrangement of three fluorescent tubes arranged on the inside of the reflector is different. Since other configurations are basically similar to the first embodiment, their illustration and explanation of the same portions are omitted.

In the fifth embodiment, the red color fluorescent tube 13R, the green color fluorescent tube 13G, and the blue color fluorescent tube 13B are arranged on the inside of the reflector 12. The green color fluorescent tube 13G is arranged at the position closest to the end surface in a longitudinal direction of the light guide plate 1, and the red color fluorescent tube 13R and the blue color fluorescent tube 13B are arranged at the position remote from the end surface in a longitudinal direction of the light guide plate 1 to be aligned in the vertical direction.

These fluorescent tubes 13R, 13G, 13B are connected to the lighting circuits (where three sets of the luminous intensity adjusting circuits and the transformers are employed respectively) shown in FIG. 3, and a quantity of light from them can be adjusted independently.

The cylindrical green color filter 20 is provided around the green color fluorescent tube 13G. As indicated by the dot-dash line curve a in FIG. 6, this color filter 20 has the characteristic that cuts off the light whose wavelength is less than about 500 nm and the light whose wavelength is more than about 600 nm. In this case, in the fifth embodiment, the color filter 20 is not essential, and may be added appropriately according to the desired characteristic or the configuration of the light source.

In the fifth embodiment, the green color fluorescent tube 13G is arranged in the neighborhood of the end surface in a longitudinal direction of the light guide plate 1, and also the red color fluorescent tube 13R and the blue color fluorescent tube 13B, that generate the prominent red and blue color lights on the screen, are arranged at the position remote from the side surface of the light guide plate 1. In this result, there can be achieved the advantage that the striped color unevenness of the red color and the blue color can be suppressed.

In the above first to fifth embodiments, the cases where the fluorescent tubes are arranged on the end surf ace in a longitudinal direction of the light guide plate are explained. But the present invention is not limited to such cases. The present invention can be applied to a backlight unit in which the fluorescent tubes are arranged on the back surface side of the light guide plate.

What is claimed is:

1. A backlight unit comprising:
a plurality of light sources including a white color fluorescent tube, a red color fluorescent tube, a green color fluorescent tube, and a blue color fluorescent tube; and
a light guide plate for receiving lights emitted from said plurality of light sources and emitting the lights to a predetermined direction,
wherein said white fluorescent tube is arranged at a position closer to said light guide plate than other color fluorescent tubes.

2. A backlight unit comprising:
a plurality of light sources whose luminescent chromaticities are different mutually; and
a light guide plate for receiving lights emitted from said plurality of light sources and emitting the lights in a predetermined direction,
wherein said plurality of light sources include one fluorescent tube arranged at a position closer to said light guide plate than the other light sources, and a green color fluorescent tube arranged at a position remote from said one fluorescent tube relative to said light guide plate.

3. A backlight unit comprising:
a plurality of light sources whose luminescent chromaticities are different mutually;
a light guide plate for receiving lights emitted from said plurality of light sources and emitting the lights to a predetermined direction; and
a filter interposed between at least one light source of the plurality of light sources and said light guide plate to limit a wavelength of a transmitted light.

4. A backlight unit according to claim 3, wherein said filter is arranged between a light source, that generates a green color light, of said plurality of light sources and said light guide plate to limit a transmittance of a light having wavelengths other than a main wavelength of a light source that generates said green color light.

5. A backlight unit according to claim 4, wherein said light source that generates said green color light is a fluorescent tube, and said filter has a cylindrical shape to be covered on said fluorescent tube.

6. A backlight unit comprising:
a plurality of light sources whose luminescent chromaticities arc different mutually;
a light guide plate for receiving lights emitted from said plurality of light sources and emitting the lights in a predetermined direction; and
lighting circuits for controlling a luminance of at least one light source of said plurality of light sources independently from luminances of the other light sources.

7. A backlight unit according to claim 6, wherein said plurality of light sources include a white color florescent tube, a green color florescent tube, a red color florescent tube, and a blue color florescent tube.

8. A backlight unit comprising:
a plurality of light sources including a white color fluorescent tube, a red color fluorescent tube, a green color fluorescent tube, and a blue color fluorescent tube; and
a light guide plate for receiving lights emitted from said plurality of light sources and emitting the lights in a predetermined direction,
wherein said plurality of light sources are arranged independently on four different side surfaces of said light guide plate respectively.

9. A liquid crystal display device comprising:
a liquid crystal panel;
a backlight unit for illuminating said liquid crystal panel having a plurality of light sources including a white color fluorescent tube, a red color fluorescent tube, a green color fluorescent tube, and a blue color fluorescent tube, wherein said backlight unit includes a plurality of light sources whose luminescent chromaticities are different mutually; and a light guide plate for receiving lights emitted from said plurality of light sources and emitting the lights in a predetermined direction, wherein said white color fluorescent tube is arranged at a position closer to said light guide plate, than said other color fluorescent tubes.

10. A liquid crystal display device comprising:

a liquid crystal panel; and a backlight unit for illuminating said liquid crystal panel from a back surface side, wherein said backlight unit includes a plurality of light sources whose luminescent chromaticities are different mutually;

a light guide plate for receiving lights emitted from said plurality of light sources and emitting the lights in a predetermined direction; and a filter interposed between at least one light source of the plurality of light sources and said light guide plate to limit a wavelength of a transmitted light.

11. A liquid crystal display device according to claim 10, wherein said plurality of light sources comprises a plurality of fluorescent tubes which include a tube for emitting a green light and other tubes for emitting other lights except for a green light.

12. A backlight unit according to claim 6, wherein said plurality of light sources are a red color fluorescent tube, a green color fluorescent tube, and a blue color fluorescent tube.

* * * * *

UNITED STATES PATENT AND TRADEMARK OFFICE
CERTIFICATE OF CORRECTION

PATENT NO.     : 6,672,733 B2
DATED          : January 6, 2004
INVENTOR(S)    : Shinpei Nagatani It is certified that error appears in the above-identified patent and that said Letters Patent is hereby corrected as shown below:

<u>Title page,</u>
Item [57], ABSTRACT,
Line 5, delete "end" and insert -- ends --.
Line 6, delete "plate" and insert -- plate, --.

Signed and Sealed this

Twenty-ninth Day of June, 2004

JON W. DUDAS
*Acting Director of the United States Patent and Trademark Office*